(12) United States Patent
McDaniel et al.

(10) Patent No.: US 9,163,098 B2
(45) Date of Patent: Oct. 20, 2015

(54) PROCESSES FOR PREPARING METALLOCENE-BASED CATALYST SYSTEMS

(71) Applicant: Chevron Phillips Chemical Company LP, The Woodlands, TX (US)

(72) Inventors: Max P. McDaniel, Bartlesville, OK (US); Qing Yang, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/151,848

(22) Filed: Jan. 10, 2014

(65) Prior Publication Data

US 2015/0197582 A1   Jul. 16, 2015

(51) Int. Cl.
| | |
|---|---|
| *C08F 4/642* | (2006.01) |
| *C08F 4/653* | (2006.01) |
| *C08F 4/6592* | (2006.01) |
| *C08F 10/00* | (2006.01) |
| *C08F 4/659* | (2006.01) |
| *C08F 4/52* | (2006.01) |

(52) U.S. Cl.
CPC ......... *C08F 4/65925* (2013.01); *C08F 4/65904* (2013.01); *C08F 4/65916* (2013.01); *C08F 4/65927* (2013.01); *C08F 4/52* (2013.01); *C08F 10/00* (2013.01)

(58) Field of Classification Search
CPC ............. C08F 4/65904; C08F 4/65912; C08F 4/65916; C08F 4/6592; C08F 10/00
See application file for complete search history.

(56) References Cited

U.S. PATENT DOCUMENTS

| | | | |
|---|---|---|---|
| 3,248,179 | A | 4/1966 | Norwood |
| 4,501,885 | A | 2/1985 | Sherk et al. |
| 4,588,790 | A | 5/1986 | Jenkins, III et al. |
| 5,098,667 | A | 3/1992 | Young et al. |
| 5,352,749 | A | 10/1994 | DeChellis et al. |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 6,107,230 | A | 8/2000 | McDaniel et al. |
| 6,165,929 | A | 12/2000 | McDaniel et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,524,987 | B1 | 2/2003 | Collins et al. |
| 6,548,441 | B1 | 4/2003 | McDaniel et al. |
| 6,548,442 | B1 | 4/2003 | McDaniels et al. |
| 6,576,583 | B1 | 6/2003 | McDaniel et al. |
| 6,586,544 | B2 | 7/2003 | Szul et al. |
| 6,605,675 | B2 | 8/2003 | Lynn et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,750,302 | B1 | 6/2004 | McDaniel et al. |
| 6,825,287 | B2 | 11/2004 | Mawson et al. |
| 6,833,415 | B2 | 12/2004 | Kendrick et al. |
| 6,908,971 | B2 | 6/2005 | Burns et al. |
| 6,956,094 | B2 | 10/2005 | Mawson et al. |
| 7,026,494 | B1 | 4/2006 | Yang et al. |
| 7,041,617 | B2 | 5/2006 | Jensen et al. |
| 7,199,073 | B2 | 4/2007 | Martin |
| 7,226,886 | B2 | 6/2007 | Jayaratne et al. |
| 7,294,599 | B2 | 11/2007 | Jensen et al. |
| 7,300,983 | B2 | 11/2007 | Degroot et al. |
| 7,312,283 | B2 | 12/2007 | Martin et al. |
| 7,456,243 | B2 | 11/2008 | Jensen et al. |
| 7,517,939 | B2 | 4/2009 | Yang et al. |
| 7,601,665 | B2 | 10/2009 | McDaniel et al. |
| 7,615,596 | B2 | 11/2009 | Burns et al. |
| 7,619,047 | B2 | 11/2009 | Yang et al. |
| 7,884,163 | B2 | 2/2011 | McDaniel et al. |
| 7,919,639 | B2 | 4/2011 | Murray et al. |
| 7,960,487 | B2 | 6/2011 | Yang et al. |
| 8,080,681 | B2 | 12/2011 | Murray et al. |
| 8,309,485 | B2 | 11/2012 | Yang et al. |
| 2007/0043176 | A1* | 2/2007 | Martin et al. ................... 526/64 |
| 2007/0255028 | A1 | 11/2007 | Razavi et al. |
| 2009/0240010 | A1* | 9/2009 | McDaniel et al. ............ 526/130 |
| 2010/0331501 | A1 | 12/2010 | Murray et al. |
| 2012/0077665 | A1 | 3/2012 | Ding et al. |
| 2012/0088890 | A1* | 4/2012 | Buck et al. ...................... 526/64 |

FOREIGN PATENT DOCUMENTS

WO    WO 97/22633 A1    6/1997

OTHER PUBLICATIONS

*Modern Plastics Encyclopedia*, Mid-Nov. 1995 Issue, vol. 72, No. 12, 3 pages.
*Film Extrusion Manual—Process, Materials, Properties*, TAPPI Press, 1992, 16 pages.
International Search Report and the Invitation to Pay Additional Fees in PCT/US2015/010136 dated May 6, 2015, 6 pages.
International Search Report and the Written Opinion of the International Searching Authority in PCT/US2015/010136 dated Jul. 8, 2015, 8 pages.

* cited by examiner

*Primary Examiner* — Caixia Lu
(74) *Attorney, Agent, or Firm* — Merchant & Gould

(57) ABSTRACT

Methods for preparing single and dual metallocene catalyst systems containing an activator-support are disclosed. These methods can include precontacting of the activator-support and an organoaluminum compound, as well as sequential contacting of two different metallocene compounds to form a dual metallocene catalyst system.

22 Claims, 2 Drawing Sheets

PROCESSES FOR PREPARING METALLOCENE-BASED CATALYST SYSTEMS

BACKGROUND OF THE INVENTION

There are various methods used to prepare single metallocene and dual metallocene catalyst systems containing an activator-support. These catalyst systems can be used to polymerize olefins to produce olefin-based polymers, such as ethylene/α-olefin copolymers. For the same initial components of the catalyst system, it would be beneficial for these catalyst systems to have higher catalyst activity and to produce polymers having high molecular weights, as a result of the method used to prepare the catalyst system. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to methods of preparing metallocene-based catalyst compositions, and to the resultant catalyst compositions. Catalyst compositions of the present invention can be used to produce, for example, ethylene-based homopolymers and copolymers.

Various processes and methods related to the preparation of single and dual metallocene catalyst compositions are disclosed herein. In one embodiment, a process for producing a catalyst composition is provided herein, and in this embodiment, the process can comprise (i) contacting an activator-support and an organoaluminum compound for a first period of time to form a precontacted mixture; and (ii) contacting the precontacted mixture with a metallocene compound for a second period of time to form the catalyst composition. In another embodiment, a process for producing a dual metallocene catalyst composition is provided, and in this embodiment, the process can comprise (a) contacting a first metallocene compound and an organoaluminum compound with a slurry of an activator-support for a first period of time to form a first mixture; and (b) contacting the first mixture with a second metallocene compound for a second period of time to form the dual metallocene catalyst composition. In yet another embodiment, a process for producing a dual metallocene catalyst composition is provided, and in this embodiment, the process can comprise (A) contacting an activator-support and an organoaluminum compound for a first period of time to form a precontacted mixture; (B) contacting the precontacted mixture with a first metallocene compound for a second period of time to form a first mixture; and (C) contacting the first mixture with a second metallocene compound for a third period of time to form the dual metallocene catalyst composition. While not wishing to be bound by theory, Applicants believe that dual metallocene catalyst compositions, prepared as described herein, can have one or more of the following benefits: a unique or separate reaction environment for each metallocene compound; improved catalyst homogeneity and uniformity; easier control of the relative amounts of the two metallocene compounds to impact polymer properties; less gels; increased catalyst activity; and the capability to produce higher molecular weight polymers using the same metallocene compounds.

Catalyst compositions also are encompassed by the present invention. In one embodiment, the catalyst composition can comprise (i) a precontacted mixture comprising an activator-support and an organoaluminum compound; and (ii) a metallocene compound. In another embodiment, a dual metallocene composition is provided, and in this embodiment, the catalyst composition can comprise (a) a first mixture comprising a first metallocene compound, an activator-support, and an organoaluminum compound; and (b) a second metallocene compound. In yet another embodiment, a dual metallocene composition is provided, and in this embodiment, the catalyst composition can comprise a first mixture comprising a first metallocene compound, and a precontacted mixture comprising an activator-support and an organoaluminum compound; and a second metallocene compound.

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the single or dual metallocene catalyst systems disclosed herein, for instance, any of the metallocene compounds, any of activator-supports, and any of the organoaluminum compounds disclosed herein.

Polymers produced from the polymerization of olefins, resulting in homopolymers, copolymers, terpolymers, etc., can be used to produce various articles of manufacture.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
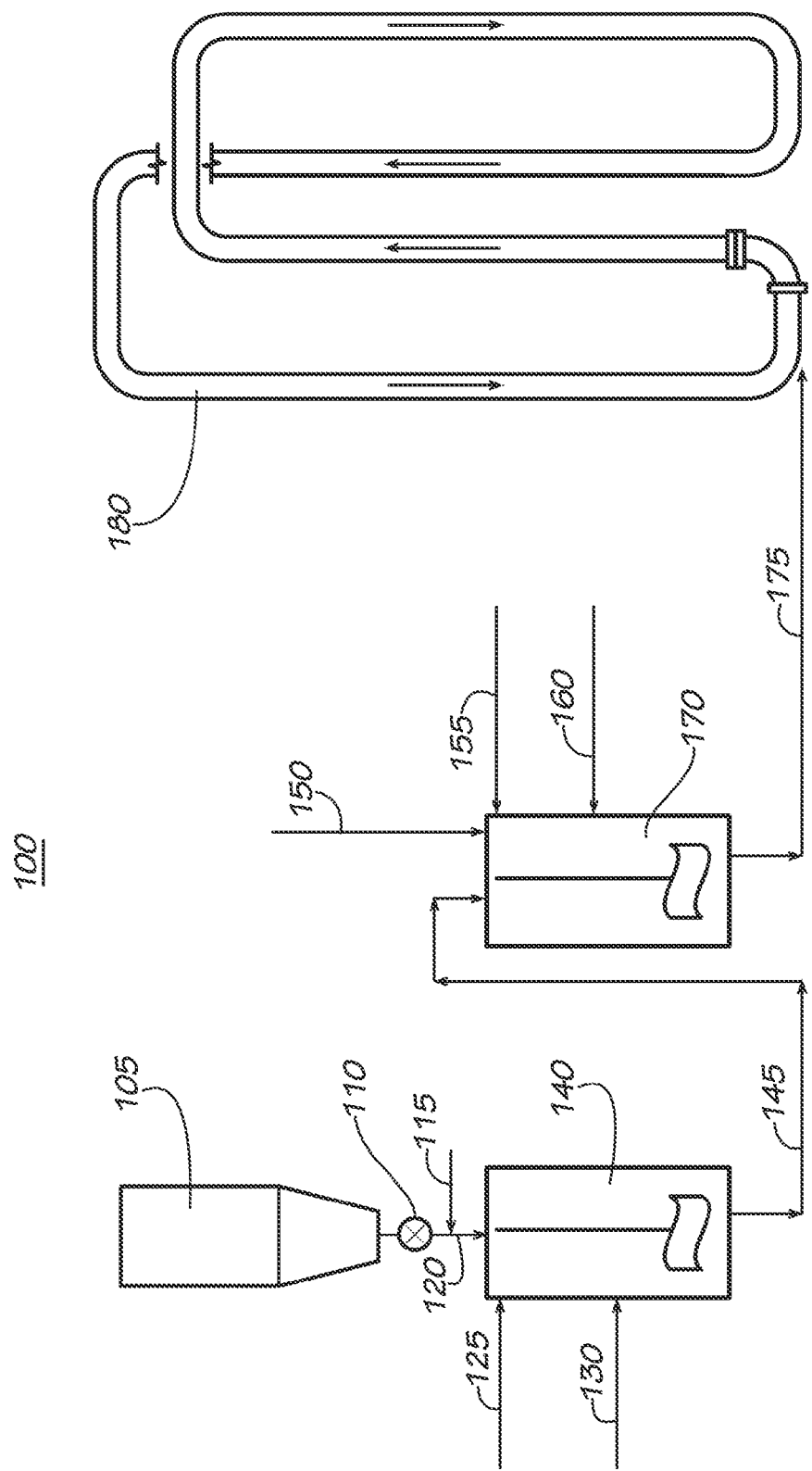
FIG. 1 shows an illustrative catalyst preparation and reactor system consistent with embodiments of this invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator-support," "an olefin comonomer," etc., is meant to encompass one, or mixtures or combinations of more than one, activator-support, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence or absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of the first metallocene compound to the second metallocene compound can be in a range from about 1:10 to about 10:1 in certain embodiments. By a disclosure that the weight ratio can be in a range from about 1:10 to about 10:1, Applicants intend to recite that the weight ratio can be any weight ratio within the range and, for example, can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process can involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the organoaluminum compound, the metallocene compound(s), or the activator-support, after combining these components. Therefore, the terms "catalyst composition," "catalyst mixture," "catalyst system," and the like, can encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are combined or contacted together in any order, in any manner, and for any length of time, unless otherwise specified. For example, the components can be contacted by blending or mixing. Further, unless otherwise specified, the contacting of any component can occur in the presence or absence of any other component of the compositions described herein. Combining additional materials or components can be done by any suitable method. These terms encompass mixtures, blends, solutions, slurries, reaction products, and the like, as well as combinations thereof.

The terms "precontacted mixture," "first mixture," and the like, describe mixtures of catalyst components that are combined or contacted for a period of time prior to being contacted with other catalyst components. According to this description, it is possible for the components of these mixtures, once contacted, to have reacted to form at least one chemical compound, formulation, species, or structure different from the distinct initial compounds or components used to prepare these precontacted mixtures or first mixtures.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are methods for preparing single and dual metallocene catalyst compositions containing an activator-support. Polymerization processes utilizing these catalyst compositions also are disclosed.

Methods for Preparing Catalyst Compositions

Various processes for preparing a catalyst composition containing a metallocene compound (one or more), an activator-support, and an organoaluminum compound are disclosed and described. One such process for producing a catalyst composition can comprise (or consist essentially of, or consist of):

(i) contacting an activator-support and an organoaluminum compound for a first period of time to form a precontacted mixture; and (ii) contacting the precontacted mixture with a metallocene compound for a second period of time to form the catalyst composition.

Generally, the features of any of the processes disclosed herein (e.g., the activator-support, the organoaluminum compound, the metallocene compound, the first period of time, the second period of time, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

Step (i) of the process often can be referred to as the precontacting step, and in the precontacting step, an activator-support can be combined with an organoaluminum compound for a first period of time to form a precontacted mixture. The precontacting step can be conducted at a variety of temperatures and time periods. For instance, the precontacting step can be conducted at a precontacting temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where the precontacting step is conducted at a series of different temperatures, instead of at a single fixed temperature, falling within the respective ranges.

The duration of the precontacting step (the first period of time) is not limited to any particular period of time. Hence, the first period of time can be, for example, in a time period ranging from as little as 1-10 seconds to as long as 24-48 hours, or more. The appropriate first period of time can depend upon, for example, the precontacting temperature, the amounts of the activator-support and the organoaluminum compounds in the precontacted mixture, the presence of diluents or solvents in the precontacting step, and the degree of mixing, among other variables. Generally, however, the first period of time can be at least about 5 sec, at least about 10 sec, at least about 30 sec, at least about 1 min, at least about 5 min, at least about 10 min, and so forth. Typical ranges for the first period of time can include, but are not limited to, from about 1 sec to about 48 hr, from about 10 sec to about 48 hr, from about 30 sec to about 24 hr, from about 30 sec to about 6 hr, from about 1 min to about 12 hr, from about 5 min to about 24 hr, or from about 10 min to about 8 hr.

Often, the precontacting step can be conducted by combining a slurry of the activator-support in a diluent with a solution of the organoaluminum compound in the same or a different diluent, and mixing to ensure sufficient contacting of the activator-support and the organoaluminum compound. However, any suitable procedure known to those of skill in the art for thoroughly combining the activator-support and the organoaluminum compound can be employed. Non-limiting examples of diluents can include, but are not limited to, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof.

In step (ii) of the process, the precontacted mixture (often, a slurry) can be contacted with a metallocene compound for a second period of time to form the catalyst composition. Step (ii), likewise, can be conducted at a variety of temperatures and time periods. For instance, the step (ii) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other embodiments, these temperature ranges also are meant to encompass circumstances where the step (ii) is conducted at a series of different temperatures, instead of at a single fixed temperature, falling within the respective ranges. As an example, the precontacted mixture and the metallocene compound can be contacted at an elevated temperature, following by cooling to a lower temperature for longer term storage of the finished catalyst composition.

The second period of time is not limited to any particular period of time. Hence, the second period of time can range from as little as 1-10 seconds to as long as 24-48 hours, or more. The appropriate second period of time can depend upon, for example, the temperature, the amounts of the precontacted mixture and the metallocene compound, the presence of diluents or solvents in step (ii), the degree of mixing, and considerations for long term storage, among other variables. Generally, however, the second period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

Often, step (ii) can be conducted by combining the precontacted mixture (slurry) with a solution of the metallocene compound in the same or a different diluent present in the precontacted mixture, and mixing to ensure sufficient contacting of the metallocene compound and the precontacted mixture (e.g., the activator-support previously combined with the organoaluminum compound). However, as described herein, any suitable procedure known to those of skill in the art for thoroughly combining the metallocene compound with the other catalyst system components can be employed. In another embodiment, an additional amount of an organoaluminum compound can be combined with the precontacted mixture and the metallocene compound, and this organoaluminum compound can be the same as or different from the organoaluminum compound utilized in the precontacting step.

In a related embodiment, a catalyst composition consistent with this invention can comprise (i) a precontacted mixture comprising an activator-support and an organoaluminum compound; and (ii) a metallocene compound.

Unexpectedly, these catalyst compositions and methods of their preparation can result in improvements in catalyst activity. For instance, the activity of the catalyst composition can be greater (e.g., by at least about 10%, by at least about 25%, by at least about 50%, by at least about 100%, etc.) than that of a catalyst system obtained by first combining the activator-support and the metallocene compound, and thereafter combining the organoaluminum compound, when compared under the same polymerization conditions. The same polymerization conditions refer to slurry polymerization conditions, using isobutane as a diluent, and with a polymerization temperature of 90° C. and a reactor pressure of 400 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the method used to produce the catalyst system, i.e., the order or sequence of contacting the respective catalyst components.

In another embodiment, the activity of the catalyst composition can be from about 15% to about 1000% greater, from about 25% to about 750% greater, from about 50% to about 850% greater, or from about 75% to about 800% greater, etc., than that of a catalyst system obtained by first combining the activator-support and the metallocene compound, and then combining the organoaluminum compound. Again, this comparison is under the same polymerization conditions, such that the only difference is the order or sequence of contacting the respective catalyst components (precontacting the activator-support and the organoaluminum compound versus no precontacting).

Other embodiments of this invention are directed to processes for producing dual metallocene catalyst compositions. One such process for producing a dual metallocene catalyst composition can comprise (or consist essentially of, or consist of):

(a) contacting a first metallocene compound and an organoaluminum compound with a slurry of an activator-support for a first period of time to form a first mixture; and (b) contacting the first mixture with a second metallocene compound for a second period of time to form the dual metallocene catalyst composition.

Generally, the features of this process (e.g., the activator-support, the organoaluminum compound, the metallocene compound, the first period of time, the second period of time, among others) are independently described herein, and these features can be combined in any combination to further describe the disclosed processes. Moreover, other process steps can be conducted before, during, and/or after any of the steps listed in this process, unless stated otherwise. Additionally, catalyst compositions produced in accordance with this process are within the scope of this disclosure and are encompassed herein.

In step (a) of the process, the first metallocene compound can be impregnated onto the activator-support. Step (a), involving the first metallocene compound, can be conducted at a variety of temperatures and time periods. For instance, step (a) can be conducted at a temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where step (a) is conducted at a series of different temperatures, instead of at a single fixed temperature, falling within the respective ranges.

The first period of time generally is not limited to any particular period of time. For instance, the first period of time can be a time sufficient for the first metallocene compound (assuming no excess) to quantitatively react with the activator-support. As one of skill in the art would readily recognize, this time period can be determined by various methods. One of these methods is by simply observing the change of color from the initial contacting of the catalyst components to the formation of the first mixture. Another of these methods is to analyze the diluent in the first mixture at different time periods to confirm that no first metallocene compound remains in the diluent (i.e., the first metallocene compound has been completely impregnated onto the activator-support, assuming no excess of the first metallocene compound). In some embodiments, however, an excess of the first metallocene compound can be employed.

Often, the first period of time can be, for example, in a time period ranging from as little as 1-10 seconds to as long as 24-48 hours, or more. The appropriate first period of time can depend upon, for example, the temperature, the amounts of the activator-support, first metallocene compound, and organoaluminum compound in the first mixture, the presence of diluents or solvents in step (a), the degree of mixing, and considerations for long term storage, among other variables. Generally, however, the first period of time can be at least about 1 sec, at least about 5 sec, at least about 10 sec, at least about 30 sec, at least about 1 min, at least about 5 min, at least about 10 min, at least about 15 min, and so forth. Assuming the first mixture is not intended for long term storage prior to addition of the second metallocene compound, which could extend for days or weeks if desired, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

In particular embodiments, step (a) can be conducted by combining a slurry of the activator-support in a diluent with a solution of the organoaluminum compound and a solution of the first metallocene compound (which can be solutions in the same or a different diluent), and mixing these components to ensure sufficient contacting of the activator-support, the organoaluminum compound, and the first metallocene compound. However, any suitable procedure known to those of skill in the art for thoroughly combining the activator-support, the organoaluminum compound, and the first metallocene compound can be employed.

In step (b) of the process, the first mixture (often, a slurry) can be contacted with a second metallocene compound for a second period of time to form the dual metallocene catalyst composition. Step (b), likewise, can be conducted at a variety of temperatures and time periods. For instance, step (b) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other embodiments, these temperature ranges also are meant to encompass circumstances where step (b) is conducted at a series of different temperatures, instead of at a single fixed temperature, falling within the respective ranges. As an example, the first mixture and the second metallocene compound can be contacted at an elevated temperature, following by cooling to a lower temperature for longer term storage of the finished dual metallocene catalyst composition.

The second period of time generally is not limited to any particular period of time. For instance, the second period of time can be a time sufficient for the second metallocene compound (assuming no excess) to react with the activator-support, but not displace the first metallocene compound from the activator-support. As to the latter, while not wishing to be bound by theory, Applicants believe that, in some embodiments, it can be beneficial to not use an excess of the second metallocene compound, such that the second metallocene compound does not displace the first metallocene compound from the activator-support. As to the former, as one of skill in the art would readily recognize, the second period of time can be determined by various methods. One of these methods is by simply observing the change of color from the initial contacting of the second metallocene compound and the first mixture to the formation of the dual metallocene catalyst composition. Another method is to analyze residual diluent in the dual metallocene catalyst composition at different time periods to confirm that no second metallocene compound remains, and no first metallocene compound is present, in the diluent (i.e., the first metallocene compound and the second metallocene compound have been completely impregnated onto the activator-support, assuming no excess of either metallocene compound). In other embodiments, however, an excess of the first metallocene compound can be employed, or an excess of the second metallocene compound can be employed, or an excess of both the first metallocene compound and the second metallocene compound can be employed (e.g., some displacement of the metallocene compound(s) from the activator-support may be acceptable in certain embodiments).

Often, the second period of time can be, for example, in a time period ranging from as little as 1-10 seconds to as long as 24-48 hours, or more. The appropriate second period of time can depend upon, for example, the temperature, the amounts of the first mixture and the second metallocene compound, the presence of diluents or solvents in step (b), the degree of mixing, and considerations for long term storage, among other variables. Generally, however, the second period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

In particular embodiments, step (b) can be conducted by combining a slurry of the first mixture (e.g., the first metallocene compound and the organoaluminum compound combined with the activator-support) in a diluent with a solution of the second metallocene compound—which can be a solution in the same or a different diluent—and mixing these components to ensure sufficient contacting of the first mixture and the second metallocene compound. However, as described herein, any suitable procedure known to those of skill in the art for thoroughly combining the components of a dual metallocene catalyst system can be employed.

In another embodiment, step (b) can further comprise contacting the first mixture with the second metallocene compound and an additional organoaluminum compound. This additional organoaluminum compound can be the same as or different from the organoaluminum compound utilized in step (a).

In an embodiment related to these methods for preparing dual metallocene catalyst compositions, a dual metallocene catalyst composition consistent with this invention can comprise (a) a first mixture comprising a first metallocene compound, an activator-support, and an organoaluminum compound; and (b) a second metallocene compound.

Referring now to FIG. 1, a representative catalyst preparation and reactor system 100 consistent with certain embodiments of this invention is illustrated. This system can include an activator-support vessel 105, a first mixing vessel 140, a second mixing vessel 170, and a polymerization reactor 180. The activator-support vessel 105 generally can contain an activator-support (e.g., activator-support particles) and a diluent (e.g., hydrocarbons such as isobutane and the like). The activator-support vessel 105 can include a mixing device or agitator to maintain a slurry of the particles, preventing the particles from settling, agglomerating, etc. At the exit of the activator-support vessel 105 is a flow valve 110 for controlling the flow rate of activator-support from the activator-support vessel 105 into the first mixing vessel 140. A first diluent feed stream 115 can be combined with the activator-support particle stream from the activator-support vessel 105 to aid in transport of the activator-support particles (e.g., to flush the particles), to provide additional diluent to the first mixing vessel 140, etc. This combined feed stream 120 enters the first mixing vessel 140, which contains a mixing device or agitator. A first metallocene compound feed stream 125 and a first organoaluminum compound feed stream 130 can deliver a first metallocene compound and a first organoaluminum compound, respectively, to the first mixing vessel 140. In addition to the first metallocene compound in the first metallocene compound feed stream 125 and the first organoaluminum compound in the first organoaluminum compound feed stream 130, these respective feed streams also can contain a diluent or solvent, which can be the same as or different from that in the first diluent feed stream 115. The relative amounts of the activator-support, the first metallocene compound, and the first organoaluminum compound that are combined or contacted in the first mixing vessel 140 can be controlled by varying the relative flow rates of the feed streams. For example, the relative amounts of the first metallocene compound and the first organoaluminum compound can be varied by adjusting the relative feed rates of the first metallocene compound feed stream 125 and the first organoaluminum compound feed stream 130. The residence time of the components in the first mixing vessel can be controlled, e.g., to allow impregnation of the first metallocene compound onto the activator-support, to result in the ultimate formation of a supported catalyst containing the first metallocene, etc.

The exit stream 145 from the first mixing vessel 140 contains an active, supported catalyst containing the first metallocene compound, and enters the second mixing vessel 170, which contains a mixing device or agitator. A second diluent feed stream 150, a second metallocene compound feed stream 155, and a second organoaluminum compound feed stream 160 can deliver additional diluent, a second metallocene compound, and a second organoaluminum compound, respectively, to the second mixing vessel 170. The second diluent feed stream 150 can add additional diluent, which is the same as or different from that used in the first diluent feed stream 115, to the second mixing vessel 170, and can be used to adjust the residence time in the second mixing vessel 170. Optionally, a second organoaluminum compound can be added to the second mixing vessel 170 via the second organoaluminum compound feed stream 160 (with or without a diluent), and this second organoaluminum compound can be the same as or different from the first organoaluminum compound in the first organoaluminum compound feed stream 130. The second metallocene compound can enter the second mixing vessel 170 via the second metallocene compound feed stream 155, which can contain a diluent or solvent, which can be the same as or different from that in either the first diluent feed stream 115 or the second diluent feed stream 150.

The relative amount of the second metallocene compound that is combined with the supported catalyst (which already contains the first metallocene compound) in stream 145 can be controlled by varying the relative flow rates of the feed streams into the second mixing vessel 170 and the residence time in the second mixing vessel 170. For example, the relative amount of the second metallocene compound (as compared to the first metallocene compound) supported onto the activator-support can be varied by adjusting the relative feed rates of the exit stream 145 from the first mixing vessel 140 and the second metallocene compound feed stream 155. The residence time of the components in the second mixing vessel can be controlled, e.g., to allow impregnation of the second metallocene compound onto the activator-support, to result in the ultimate formation of a dual metallocene supported catalyst containing the first metallocene compound and the second metallocene compound, etc.

The exit stream 175 from the second mixing vessel 140 contains an active, supported dual catalyst containing the first metallocene compound and the second metallocene compound, and enters the polymerization reactor 180. A loop slurry reactor is illustrated in FIG. 1, but the reactor type is not limited thereto. For instance, other reactor types and configurations, such as a solution reactor, a gas phase reactor, a slurry reactor in combination with another reactor type, and so forth, can be employed. Moreover, other catalyst components (metallocene compound(s), activator-supports, organoaluminum compound(s), diluents, etc.) can be fed directly to the polymerization reactor 180 in addition to the components present in stream 175.

In another embodiment of this invention, an alternative process for producing a dual metallocene catalyst composition is described. This process for producing a dual metallocene catalyst composition can comprise (or consist essentially of, or consist of):

(A) contacting an activator-support and an organoaluminum compound for a first period of time to form a precontacted mixture;

(B) contacting the precontacted mixture with a first metallocene compound for a second period of time to form a first mixture; and (C) contacting the first mixture with a second metallocene compound for a third period of time to form the dual metallocene catalyst composition.

Generally, the features of this process (e.g., the activator-support, the organoaluminum compound, the first metallocene compound, the second metallocene compound, the first period of time, the second period of time, the third period of time, among others) are independently described herein, and these features can be combined in any combination to further describe the disclosed processes. Moreover, other process steps can be conducted before, during, and/or after any of the steps listed in this process, unless stated otherwise. Additionally, catalyst compositions produced in accordance with this process are within the scope of this disclosure and are encompassed herein.

Step (A) of this process often can be referred to as the precontacting step, and in the precontacting step, an activator-support can be combined with an organoaluminum compound for a first period of time to form a precontacted mixture. The precontacting step can be conducted at a variety of temperatures and time periods. For instance, the precontacting step can be conducted at a precontacting temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where the precontacting step is conducted at a series of different temperatures, instead of at a single fixed temperature, falling within the respective ranges.

The duration of the precontacting step (the first period of time) is not limited to any particular period of time. Hence, the first period of time can be, for example, in a time period ranging from as little as 1-10 seconds to as long as 24-48 hours, or more. The appropriate first period of time can depend upon, for example, the precontacting temperature, the amounts of the activator-support and the organoaluminum compounds in the precontacted mixture, the presence of diluents or solvents in the precontacting step, and the degree of mixing, among other variables. Generally, however, the first period of time can be at least about 5 sec, at least about 10 sec, at least about 30 sec, at least about 1 min, at least about 5 min, at least about 10 min, and so forth. Typical ranges for the first period of time can include, but are not limited to, from about 1 sec to about 48 hr, from about 10 sec to about 48 hr, from about 30 sec to about 24 hr, from about 30 sec to about 6 hr, from about 1 min to about 12 hr, from about 5 min to about 24 hr, or from about 10 min to about 8 hr.

Often, the precontacting step can be conducted by combining a slurry of the activator-support in a diluent with a solution of the organoaluminum compound in the same or a different diluent, and mixing to ensure sufficient contacting of the activator-support and the organoaluminum compound. However, any suitable procedure known to those of skill in the art for thoroughly combining the activator-support and the organoaluminum compound can be employed.

In step (B) of the process, the first metallocene compound can be impregnated onto the activator-support present in the precontacted mixture. Step (B), involving the first metallocene compound, can be conducted at a variety of temperatures and time periods. For instance, step (B) can be conducted at a temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other embodiments, these temperature ranges also are meant to encompass circumstances where step (B) is conducted at a series of different temperatures, instead of at a single fixed temperature, falling within the respective ranges.

The second period of time generally is not limited to any particular period of time. For instance, the second period of time can be a time sufficient for the first metallocene compound (assuming no excess) to quantitatively react with the activator-support. As one of skill in the art would readily recognize, this time period can be determined by various methods. One of these methods is by simply observing the change of color from the initial contacting of the catalyst components to the formation of the first mixture. Another of these methods is to analyze the diluent in the first mixture at different time periods to confirm that no first metallocene compound remains in the diluent (i.e., the first metallocene compound has been completely impregnated onto the activator-support, assuming no excess of the first metallocene compound). In some embodiments, however, an excess of the first metallocene compound can be employed.

Often, the second period of time can be, for example, in a time period ranging from as little as 1-10 seconds to as long as 24-48 hours, or more. The appropriate second period of time can depend upon, for example, the temperature, the amounts of the activator-support and organoaluminum compound in the precontacted mixture, the amount of the first metallocene compound, the presence of diluents or solvents in step (B), the degree of mixing, and considerations for long term storage, among other variables. Generally, however, the second period of time can be at least about 1 sec, at least about 5 sec, at least about 10 sec, at least about 30 sec, at least about 1 min, at least about 5 min, at least about 10 min, and so forth. Assuming the first mixture is not intended for long term storage prior to addition of the second metallocene compound, which could extend for days or weeks if desired, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

In particular embodiments, step (B) can be conducted by combining the precontacted mixture (slurry) with a solution of the first metallocene compound in the same or a different diluent present in the precontacted mixture, and mixing to ensure sufficient contacting of the first metallocene compound and the precontacted mixture (e.g., the activator-support previously combined with the organoaluminum compound). However, as described herein, any suitable procedure known to those of skill in the art for thoroughly combining the first metallocene compound with the other catalyst system components can be employed.

In another embodiment, step (B) can further comprise contacting the precontacted mixture with the first metallocene compound and a first additional organoaluminum compound. This first additional organoaluminum compound can be the same as or different from the organoaluminum compound utilized in precontacting step.

In step (C) of the process, the first mixture (often, a slurry) can be contacted with a second metallocene compound for a third period of time to form the dual metallocene catalyst composition. Step (C), likewise, can be conducted at a variety of temperatures and time periods. For instance, step (C) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other embodiments, these temperature ranges also are meant to encompass circumstances where step (C) is conducted at a series of different temperatures, instead of at a single fixed temperature, falling within the respective ranges. As an example, the first mixture and the second metallocene compound can be contacted at an elevated temperature, following by cooling to a lower temperature for longer term storage of the finished dual metallocene catalyst composition.

The third period of time generally is not limited to any particular period of time. For instance, the third period of time can be a time sufficient for the second metallocene compound (assuming no excess) to react with the activator-support, but not displace the first metallocene compound from the activator-support. As to the latter, while not wishing to be bound by theory, Applicants believe that, in some embodiments, it can be beneficial to not use an excess of the second metallocene compound, such that the second metallocene compound does not displace the first metallocene compound from the activator-support. As to the former, as one of skill in the art would readily recognize, the third period of time can be determined by various methods. One of these methods is by simply observing the change of color from the initial contacting of the second metallocene compound and the first mixture to the formation of the dual metallocene catalyst composition. Another method is to analyze residual diluent in the dual metallocene catalyst composition at different time periods to confirm that no second metallocene compound remains, and no first metallocene compound is present, in the diluent (i.e., the first metallocene compound and the second metallocene compound have been completely impregnated onto the activator-support, assuming no excess of either metallocene compound). In other embodiments, however, an excess of the first metallocene compound can be employed, or an excess of the second metallocene compound can be employed, or an excess of both the first metallocene compound and the second metallocene compound can be employed (e.g., some displacement of the metallocene compound(s) from the activator-support may be acceptable in certain embodiments).

Often, the third period of time can be, for example, in a time period ranging from as little as 1-10 seconds to as long as 24-48 hours, or more. The appropriate third period of time can depend upon, for example, the temperature, the amounts of the first mixture and the second metallocene compound, the presence of diluents or solvents in step (C), the degree of mixing, and considerations for long term storage, among other variables. Generally, however, the third period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the third period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

In particular embodiments, step (C) can be conducted by combining a slurry of the first mixture (e.g., the first metallocene compound and the precontacted mixture of the organoaluminum compound and the activator-support) in a diluent with a solution of the second metallocene compound—which can be a solution in the same or a different diluent—and mixing these components to ensure sufficient contacting of the first mixture and the second metallocene compound. However, as described herein, any suitable procedure known to those of skill in the art for thoroughly combining the components of a dual metallocene catalyst system can be employed.

In another embodiment, step (C) can further comprise contacting the first mixture with the second metallocene compound and a second additional organoaluminum compound. This second additional organoaluminum compound can be the same as or different from the organoaluminum compound utilized in step (A) or step (B).

In another embodiment related to these methods for preparing dual metallocene catalyst compositions, a dual metallocene catalyst composition consistent with this invention can comprise a first mixture and a second metallocene compound, the first mixture comprising a first metallocene compound and a precontacted mixture comprising an activator-support and an organoaluminum compound.

Consistent with specific embodiments of this invention, the first metallocene compound can be less reactive with the activator-support than the second metallocene compound. As one of skill in the art would readily recognize, the relative reactivity of the first metallocene compound and the second metallocene compound with the activator-support can be determined by various methods. One of these methods is by simply determining the Lewis basicity of the first metallocene compound and the second metallocene compound; the metallocene compound with lower Lewis basicity is less reactive. Another of these methods is to prepare a 1:1 (molar) mixture of the first metallocene compound and the second metallocene compound in a diluent, and combine the mixture with a small amount of the activator-support to determine which metallocene compound is preferentially supported (more reactive). The diluent is analyzed for the amount of each respective metallocene, and the metallocene compound that is present in a greater amount (by moles) in the diluent is the less reactive metallocene compound.

The weight ratio of the first metallocene compound to the second metallocene compound in the dual catalyst system generally is not limited to any particular range of weight ratios. Nonetheless, in some embodiments, the weight ratio of the first metallocene compound to the second metallocene compound can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene compound to the second metallocene compound can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Unexpectedly, these dual catalyst compositions and methods of their preparation can result in improvements in catalyst activity. For instance, the activity of the dual catalyst composition can be greater (e.g., by at least about 10%, by at least about 15%, by at least about 25%, by at least about 50%, by at least about 100%, etc.) than that of a dual catalyst system obtained by combining the activator-support, a mixture of the first metallocene compound and the second metallocene compound, and the organoaluminum compound, when compared under the same polymerization conditions. The same polymerization conditions refer to slurry polymerization conditions, using isobutane as a diluent, and with a polymerization temperature of 90° C. and a reactor pressure of 400 psig. Moreover, all components used to prepare the catalyst systems are held constant (e.g., same amount/type of metallocene compounds, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the method used to produce the catalyst system, i.e., sequential contacting of the first metallocene compound followed by the second metallocene compound, versus contacting of a mixture of the first and second metallocene compounds.

Also unexpectedly, these dual catalyst compositions and methods of their preparation can result in polymers having increased Mw (weight average molecular weight). For instance, the Mw of an olefin polymer produced using the dual catalyst composition can be greater (by at least about 5%, at least about 10%, at least about 15%, etc.) than that of an olefin polymer produced using a dual catalyst system obtained by combining the activator-support, a mixture of the first metallocene compound and the second metallocene compound, and the organoaluminum compound, when compared under the same polymerization conditions (as described hereinabove). Hence, the only difference is the method used to produce the catalyst system, i.e., sequential contacting of the first metallocene compound followed by the second metallocene compound, versus contacting of a mixture of the first and second metallocene compounds. The Mw (g/mol) can be determined using gel permeation chromatography (GPC) or other suitable analytical procedure for determining the molecular weight distribution of an olefin polymer.

Generally, in the catalyst compositions and methods of their preparation disclosed herein, the weight ratio of activator-support(s) to organoaluminum compound(s) can be in a range from about 1:10 to about 1000:1, or from about 1:5 to about 1000:1. If more than one organoaluminum compound and/or more than one activator-support are employed, this ratio is based on the total weight of each respective component. In an embodiment, the weight ratio of the activator-support to the organoaluminum compound can be in a range from about 1:1 to about 500:1, from about 1:3 to about 200:1, or from about 1:1 to about 100:1.

Likewise, the weight ratio of metallocene compound(s) (e.g., first and second metallocene compounds) to activator-support(s) can be in a range from about 1:1 to about 1:1,000,000, or from about 1:5 to about 1:250,000. If more than one metallocene compound and/or more than one activator-support are employed, this ratio is based on the total weight of each respective component. In an embodiment, the weight ratio of metallocene compound to activator-support can be in a range from about 1:10 to about 1:10,000, or from about 1:20 to about 1:1000.

In some embodiments, the catalyst compositions and methods of their preparation are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these embodiments, the catalyst composition has catalyst activity, as discussed herein, in the absence of these additional materials. For example, a catalyst composition of the present invention can consist essentially of a metallocene compound (or first and second metallocene compounds), an activator-support, and an organoaluminum compound, wherein no other materials are present in the catalyst composition which would increase/decrease the activity of the catalyst composition by more than about 10% from the catalyst activity of the catalyst composition in the absence of said materials.

Metallocene Compounds

Dual metallocene catalyst compositions consistent with this invention can contain a first metallocene compound and a second metallocene compound. The first metallocene compound and the second metallocene compound, independently can comprise, for example, a transition metal (one or more than one) from Groups IIIB-VIIIB of the Periodic Table of the Elements. In one embodiment, the first metallocene compound and the second metallocene compound independently can comprise a Group III, IV, V, or VI transition metal, or a combination of two or more transition metals. The first metallocene compound and the second metallocene compound independently can comprise chromium, titanium, zirconium, hafnium, vanadium, or a combination thereof, or can comprise titanium, zirconium, hafnium, or a combination thereof, in other embodiments. Accordingly, the first metallocene compound and the second metallocene compound independently can comprise titanium, or zirconium, or hafnium, either singly or in combination.

In particular embodiments, the first metallocene compound can produce a higher molecular weight component of the olefin polymer than the second metallocene compound, for example, the first metallocene compound can produce the higher molecular weight component of the olefin polymer, and the second metallocene compound can produce the lower molecular weight component of the olefin polymer. These component terms are relative, are used in reference to each other, and are not limited to the actual molecular weights of the respective components.

While not being limited thereto, the first metallocene compound generally can comprise a bridged metallocene compound, e.g., with titanium, zirconium, or hafnium, such as a bridged zirconium or hafnium based metallocene compound with a fluorenyl group, and with no aryl groups on the bridging group, or a bridged zirconium or hafnium based metallocene compound with a cyclopentadienyl group and a fluorenyl group, and with no aryl groups on the bridging group. Such bridged metallocenes, in some embodiments, can contain an alkenyl substituent (e.g., a terminal alkenyl) on the bridging group and/or on a cyclopentadienyl-type group (e.g., a cyclopentadienyl group, a fluorenyl group, etc.). In another embodiment, the first metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other embodiments, the aryl group on the bridging group can be a phenyl group. Optionally, these bridged metallocenes can contain an alkenyl substituent (e.g., a terminal alkenyl) on the bridging group and/or on a cyclopentadienyl-type group.

In some embodiments, the first metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some embodiments, an aryl group can be present on the bridging group, while in other embodiments, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with embodiments of the present invention are described in U.S. Pat. Nos. 7,026,494, 7,041,617, 7,226,886, 7,312,283, 7,517,939, and 7,619,047, the disclosures of which are incorporated herein by reference in their entirety.

While not being limited thereto, the second metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with embodiments of the present invention are described in U.S. Pat. Nos. 7,199,073, 7,226, 886, 7,312,283, and 7,619,047, the disclosures of which are incorporated herein by reference in their entirety.

Moreover, the second metallocene compound can comprise an unbridged dinuclear metallocene such as those described in U.S. Pat. Nos. 7,919,639 and 8,080,681, the disclosures of which are incorporated herein by reference in their entirety. The second metallocene compound can comprise an unbridged zirconium and/or hafnium based dinuclear metallocene compound. For example, the second metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

In another embodiment, the first metallocene compound can produce the higher molecular weight component of the olefin polymer, and the first metallocene compound (bridged) can comprise zirconium or hafnium, and can contain a cyclopentadienyl group and a fluorenyl group. In another embodiment, the second metallocene compound can produce the lower molecular weight component of the olefin polymer, and the second metallocene compound (unbridged) can comprise zirconium or hafnium, and can contain two cyclopentadienyl groups, two indenyl groups, or a cyclopentadienyl and an indenyl group.

Embodiments of this invention also are directed to catalyst compositions and methods of preparing catalyst compositions in which a single metallocene compound is employed, i.e., in contrast to a dual metallocene catalyst composition. This single metallocene compound can be any first metallocene compound or second metallocene compound disclosed herein, for example, any bridged metallocene compound disclosed herein or any unbridged metallocene compound disclosed herein.

Activator-Supports

The present invention encompasses various catalyst compositions containing an activator-support, and various methods of preparing catalyst compositions using an activator-support. In one embodiment, the activator-support can comprise a solid oxide treated with an electron-withdrawing anion. Alternatively, in another embodiment, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one embodiment, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another embodiment, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one embodiment, the silica content of these solid oxides can be from about 10 to about 80%, or from about 20% to about 70%, silica by weight. In another embodiment, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other embodiments, the electron-withdrawing anion can comprise fluoride and/or sulfate.

The activator-support generally can contain from about 1 to about 25 wt. % of the electron-withdrawing anion, based on the weight of the activator-support. In particular embodiments provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an embodiment, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another embodiment, the activator-support employed in the processes and catalyst systems described herein can be, or can comprise, a fluorided solid oxide and/or a sulfated solid oxide and/or a phosphated solid oxide, non-limiting examples of which can include fluorided alumina, sulfated alumina, phosphated alumina, fluorided silica-alumina, sulfated silica-alumina, phosphated silica-alumina, fluorided silica-zirconia, fluorided silica-coated alumina, sulfated silica-coated alumina, phosphated silica-coated alumina, and the like, as well as combinations thereof. In yet another embodiment, the activator-support can comprise fluorided alumina; alternatively, chlorided alumina; alternatively, sulfated alumina; alternatively, phosphated alumina; alternatively, fluorided silica-alumina; alternatively, sulfated silica-alumina; alternatively, phosphated silica-alumina; alternatively, fluorided silica-zirconia; alternatively, chlorided silica-zirconia; alternatively, sulfated silica-coated alumina; alternatively, phosphated silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, phosphated solid oxides, etc.) are well known to those of skill in the art.

Organoaluminum Compounds

The present invention encompasses various catalyst compositions containing an organoaluminum compound, and various methods of preparing catalyst compositions using an organoaluminum compound. More than one organoaluminum compound can be used. For instance, the organoaluminum compound used in the processes and catalyst systems disclosed herein, and any additional organoaluminum compound(s) (e.g., an additional organoaluminum compound, a first additional organoaluminum compound, a second additional organoaluminum compound), can be the same or different, and independently can comprise any suitable organoaluminum compound.

In some embodiments, suitable organoaluminum compounds can have the formula, $(R^Z)_3Al$; wherein each $R^Z$ independently can be an aliphatic group having from 1 to 10 carbon atoms. For example, each $R^Z$ independently can be methyl, ethyl, propyl, butyl, hexyl, or isobutyl. In other embodiments, suitable organoaluminum compounds can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one embodiment, each $X^7$ independently can be any hydrocarbyl having from 1 to about 18 carbon atoms, or from 1 to about 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain embodiments of the present invention. According to another embodiment of the present invention, each $X^8$ independently can be an alkoxide or an aryloxide, any one of which has from 1 to 18 carbon atoms, a halide, or a hydride. In yet another embodiment of the present invention, each $X^8$ can be selected independently from fluorine and chlorine. In the formula, $Al(X^7)_m(X^8)_{3-m}$, m can be a number from 1 to 3 (inclusive) and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. In one embodiment, an organoaluminum compound used in the processes and catalyst systems disclosed herein can comprise (or consist essentially of, or consist of) triethylaluminum (TEA), while in another embodiment, an organoaluminum compound used in the processes and catalyst systems disclosed herein can comprise (or consist essentially of, or consist of) triisobutylaluminum (TIBA). Yet, in another embodiment, TEA can be used as an organoaluminum compound in one step of processes disclosed herein (or as one organoaluminum component in the catalyst systems disclosed herein), and TIBA can be used as an organoaluminum compound in a different step of the processes disclosed herein (or as a different organoaluminum component in the catalyst systems disclosed herein).

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. For example, resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ α-olefin, a $C_3$-$C_{20}$ α-olefin, etc.). According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1- hexene, 1-heptene, 2-heptene, 3-heptene, 1-octene, 1-decene, styrene, and the like, or combinations thereof. According to another embodiment, the comonomer can comprise an α-olefin (e.g., a $C_3$-$C_{10}$ α-olefin), while in yet another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one embodiment, the olefin polymer can be (or can comprise) an ethylene homopolymer, an ethylene/1-butene copolymer, an ethylene/1-hexene copolymer, or an ethylene/1-octene copolymer; or alternatively, an ethylene/1-hexene copolymer. In another embodiment, the olefin polymer can be (or can comprise) a polypropylene homopolymer or a propylene-based copolymer. In some embodiments, the olefin polymer can have a bimodal molecular weight distribution, while in other embodiments, the olefin polymer can have a multimodal molecular weight distribution. Yet, in still other embodiments, the olefin polymer can have a unimodal molecular weight distribution.

Polymerization Reactor Systems and Processes

The disclosed catalyst systems and methods of their preparation are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 110° C., or from about 75° C. to about 95° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

Also encompassed herein are olefin polymerization processes utilizing any of the catalyst compositions described herein. One such process can comprise contacting a catalyst composition with an olefin monomer and optionally an olefin comonomer in a polymerization reactor system under polymerization conditions to produce an olefin polymer. Generally, the polymerization process can utilize any olefin monomer and optional comonomer disclosed herein, and the catalyst composition employed can be a single or dual metallocene catalyst system utilizing, for instance, any of the metallocene compounds, any of activator-supports, and any of the organoaluminum compounds disclosed herein, and the catalyst system can be prepared by any of the processes disclosed herein.

A dual metallocene catalyst composition, in one embodiment, can be produced by a process comprising (a) contacting a first metallocene compound and an organoaluminum compound with a slurry of an activator-support for a first period of time to form a first mixture; and (b) contacting the first mixture with a second metallocene compound for a second period of time to form the dual metallocene catalyst composition. A dual metallocene catalyst composition, in another embodiment, can be produced by a process comprising (A) contacting an activator-support and an organoaluminum compound for a first period of time to form a precontacted mixture; (B) contacting the precontacted mixture with a first metallocene compound for a second period of time to form a first mixture; and (C) contacting the first mixture with a second metallocene compound for a third period of time to form the dual metallocene catalyst composition. A polymerization process consistent with this invention can comprise contacting such dual catalyst compositions (i.e., prepared by sequential contacting of the first metallocene compound, then the second metallocene compound) with an olefin monomer and optionally an olefin comonomer in a polymerization reactor system under polymerization conditions to produce an olefin polymer. In an embodiment, and unexpectedly, the Mw of the olefin polymer produced by the polymerization process (using a dual catalyst prepared by sequential contacting) can be greater (e.g., by at least about 5%, by at least about 10%, by at least about 15%, by from about 5 to about 100%, by from about 5% to about 50%, etc.) than the Mw of an olefin polymer produced under the same polymerization conditions using a dual catalyst system obtained by simultaneously combining the activator-support, the first metallocene compound, the second metallocene compound, and the organoaluminum compound. The same polymerization conditions refer to slurry polymerization conditions, using isobutane as a diluent, and with a polymerization temperature of 90° C. and a reactor pressure of 400 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the method used to produce the dual catalyst system, i.e., sequential contacting of the first and second metallocene compounds versus simultaneous contacting of the first and second metallocene compounds.

In another embodiment, and unexpectedly, the olefin polymer produced by the polymerization process can comprise a higher molecular weight component and a lower molecular weight component, and the ratio of the higher molecular weight component to the lower molecular weight component of the olefin polymer produced by the polymerization process (using a dual catalyst prepared by sequential contacting) can be greater (e.g., by at least about 5%, by at least about 10%, by at least about 25%, by from about 10% to about 150%, etc.) than the ratio for an olefin polymer produced under the same polymerization conditions using a dual catalyst system obtained by simultaneously combining the activator-support, the first metallocene compound, the second metallocene compound, and the organoaluminum compound. As above, the same polymerization conditions refer to slurry polymerization conditions, using isobutane as a diluent, and with a polymerization temperature of 90° C. and a reactor pressure of 400 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina, etc.) and all polymerization conditions are held constant (e.g., same polymerization temperature, same pressure, etc.). Hence, the only difference is the method used to produce the dual catalyst system, i.e., sequential contacting of the first and second metallocene compounds versus simultaneous contacting of the first and second metallocene compounds.

This invention is also directed to, and encompasses, the polymers produced by any of the polymerization processes disclosed herein. Articles of manufacture can be formed from, and/or can comprise, the polymers (e.g., ethylene copolymers) of this invention and, accordingly, are encompassed herein. For example, articles which can comprise polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual— Process, Materials, Properties*, TAPPI Press, 1992; the disclosures of which are incorporated herein by reference in their entirety.

Applicants also contemplate a method for forming or preparing an article of manufacture comprising a polymer produced by any of the polymerization processes disclosed herein. For instance, a method can comprise (i) contacting any catalyst composition disclosed herein with an olefin monomer and an optional olefin comonomer under polymerization conditions in a polymerization reactor system to produce an olefin polymer (the catalyst composition can be prepared in accordance with any process disclosed herein); and (ii) forming an article of manufacture comprising the olefin polymer. The forming step can comprise blending, melt processing, extruding, molding, or thermoforming, and the like, including combinations thereof.

EXAMPLES

Embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 µL was used. The integral calibration method was used to deduce molecular weights and molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Sulfated alumina activator-supports were prepared as follows. Bohemite was obtained from W.R. Grace & Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Examples 1-8

Impact of Premixing an Activator-Support and an Organoaluminum Compound, Prior to Combining with a Metallocene Compound The polymerization experiments of Examples 1-8 were conducted in a one-gallon (3.8-L) stainless steel reactor with 1.8 L of isobutane. Metallocene solutions (nominal 1 mg/mL) of MET-A, MET-B, MET-C, and MET-D were prepared by dissolving 15 mg of the respective metallocene in 15 mL of toluene. The metallocene compounds had the following structures:

MET-A:

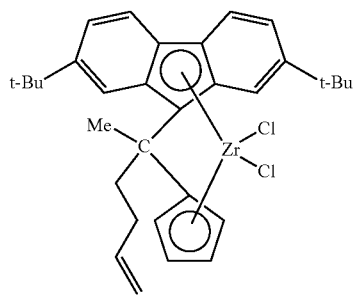

MET-B:

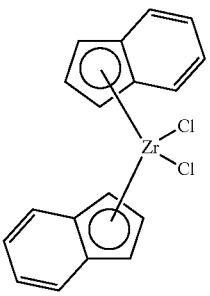

MET-C:

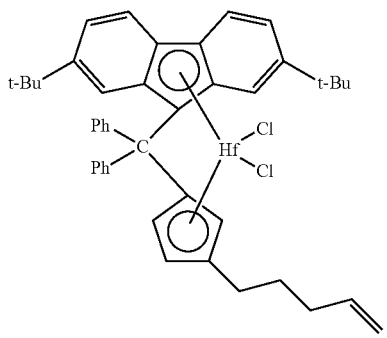

MET-D:

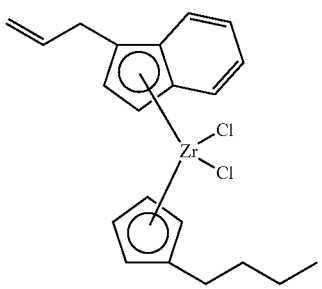

The polymerization experiments were performed as follows. In the "standard" catalyst preparation procedure, 200 or 300 mg of sulfated alumina were combined first with a metallocene solution containing 1-2 mg of the respective metallocene compound, and then this mixture was combined with 0.6-0.8 mmol of triisobutylaluminum (TIBA, 0.6-0.8 mL of a 1M solution in hexanes) to form the catalyst system. In the "premix" catalyst preparation procedure, 200 or 300 mg of sulfated alumina were combined first with 0.6-0.8 mmol of TIBA (0.6-0.8 mL of a 1M solution in hexanes) to form the catalyst and then this mixture was stirred for 15-30 min prior to combining with a metallocene solution containing 1-2 mg of the respective metallocene compound to form the catalyst system.

The "standard" catalyst system or the "premix" catalyst system was charged to the reactor while slowly venting isobutane vapor. The charge port was closed and 1.8 L of isobutane were added. The contents of the reactor were stirred and heated to the desired polymerization reaction temperature of 90-95° C., and ethylene was then introduced into the reactor with 0 to 8 g of 1-hexene. Ethylene was fed on demand to maintain the target pressure of 390-420 psig pressure for the 30-45 minute length of each polymerization experiment. The reactor was maintained at the desired reaction temperature throughout the experiment by an automated heating-cooling system.

Table I summarizes certain catalyst components, polymerization conditions, the amount of polymer produced, and the catalyst activity (grams of ethylene polymer produced per gram of sulfated alumina per hour) for Examples 1-8. As shown in Table I, and unexpectedly, premixing of the activator-support (sulfated alumina) and the organoaluminum compound (TIBA) resulted in significant improvements in catalyst activity for all of the metallocene compounds: MET-A, MET-B, MET-C, and MET-D. Furthermore, and quite surprisingly, the premixing catalyst preparation resulted in remarkable increases in catalyst activity for the bridged metallocene compounds: the increase in activity for MET-A (see Examples 1-2) was 110%, and the increase in activity for MET-C (see Examples 5-6) was 730%.

TABLE I

Summary of Examples 1-8.

| Example | Catalyst Preparation | Metallocene Compound | Metallocene Weight | Time (min) | Temperature (° C.) | Reactor Pressure (psig) | 1-Hexene (g) | Sulfated Alumina (mg) | TIBA (mmol) | PE Produced (g) | Catalyst Activity (g/g/hr) |
|---|---|---|---|---|---|---|---|---|---|---|---|
| 1 | Standard | MET-A | 2 mg | 30 | 90 | 390 | 0 | 200 | 0.6 | 177 | 1770 |
| 2 | Premix | MET-A | 2 mg | 30 | 90 | 390 | 0 | 200 | 0.6 | 372 | 3720 |
| 3 | Standard | MET-B | 2 mg | 30 | 90 | 390 | 0 | 200 | 0.6 | 290 | 2900 |
| 4 | Premix | MET-B | 2 mg | 30 | 90 | 390 | 0 | 200 | 0.6 | 335 | 3350 |
| 5 | Standard | MET-C | 1.4 mg | 45 | 95 | 420 | 8.0 | 300 | 0.8 | 32 | 142 |
| 6 | Premix | MET-C | 1.4 mg | 45 | 95 | 420 | 8.0 | 300 | 0.8 | 268 | 1191 |
| 7 | Standard | MET-D | 1 mg | 45 | 95 | 420 | 8.0 | 300 | 0.8 | 175 | 778 |
| 8 | Premix | MET-D | 1 mg | 45 | 95 | 420 | 8.0 | 300 | 0.8 | 237 | 1053 |

Examples 9-10

Impact of Sequential Addition of Metallocene Compounds

Example 9 represents a standard procedure for preparing a dual catalyst system. In this catalyst preparation, TIBA (0.6 mmol, 0.6 mL of 1M solution), sulfated alumina (200 mg), and a mixture of dual metallocene solutions (1 mg of MET-C, 1 mL of a 1 mg/mL solution; 1 mg of MET-D, 1 mL of 1 mg/mL solution) were added into a one-gallon reactor through a charge port while venting isobutane vapor. The charge port was closed and about 2 L of isobutane were added. The contents of the reactor were stirred and heated to 95° C. Ethylene, hydrogen at 300 ppm based on ethylene, and 8 g of 1-hexene were added to the reactor. Ethylene and hydrogen at the specified weight ratio were fed on demand to maintain a target pressure of 420 psig for the 45 min length of the polymerization run. The reactor was maintained at the 95° C. polymerization reaction temperature throughout the experiment by an automated heating-cooling system. After the experiment was concluded, the reactor was vented and cooled to ambient temperature, and the polymer product was collected and dried. In Example 9, 120 g of ethylene/1-hexene copolymer were produced (catalyst activity of 800 grams of polymer per gram of activator-support per hour).

Example 10 represents a sequential procedure for preparing a dual catalyst system. In this catalyst preparation, TIBA (0.6 mmol, 0.6 mL of 1M solution), sulfated alumina (200 mg) and MET-C (1 mg, 1 mL of a 1 mg/mL solution) were added into the reactor through a charge port while venting isobutane vapor. The charge port was closed and about 1 L of isobutane was added. The contents of the reactor were stirred at room temperature for about 30 min. Then, MET-D (1 mg, 1 mL of a 1 mg/mL solution) was added into the reactor with another 1 L of isobutane. The final catalyst system contents of the reactor were stirred and heated to 95° C. Ethylene, hydrogen at 300 ppm based on ethylene, and 8 g of 1-hexene were added to the reactor. Ethylene and hydrogen at the specified weight ratio were fed on demand to maintain a target pressure of 420 psig for the 45 min length of the polymerization run. The reactor was maintained at the 95° C. polymerization reaction temperature throughout the experiment by an automated heating-cooling system. After the experiment was concluded, the reactor was vented and cooled to ambient temperature, and the polymer product was collected and dried. In Example 10, 149 g of ethylene/1-hexene copolymer were produced (catalyst activity of 993 grams of polymer per gram of activator-support per hour).

Figure 2:
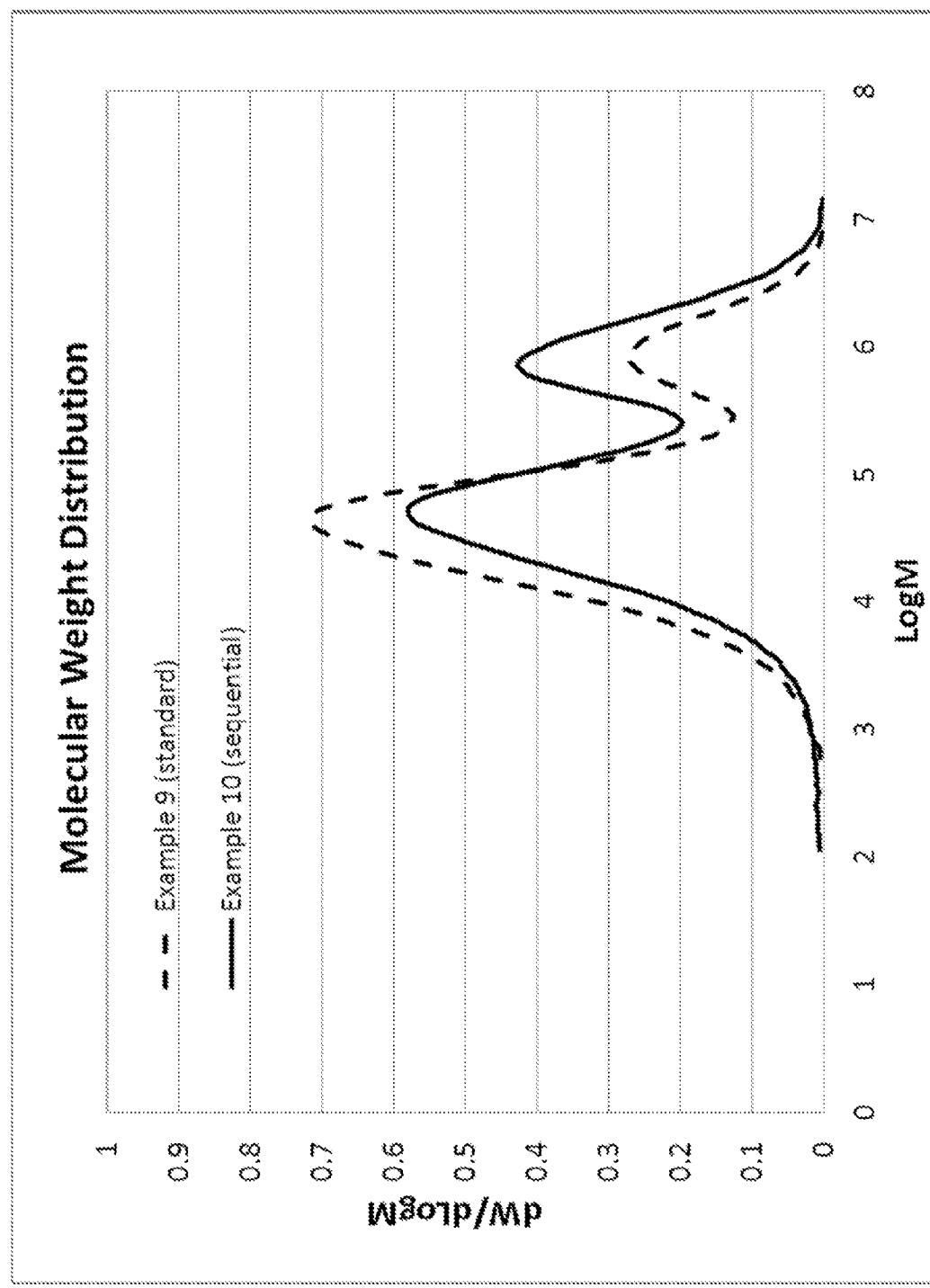
FIG. 2 shows the molecular weight distributions of the ethylene copolymers of Examples 9-10.

Unexpectedly, the sequential preparation of the catalyst system (Example 10) resulted in an improvement in catalyst activity of 24% over the standard catalyst system preparation (Example 9). Even more surprising, the sequential preparation of the catalyst system (Example 10) produced a polymer with a higher molecular weight (see FIG. 2 and Table II) as compared to the standard catalyst system preparation (Example 9). In FIG. 2, Example 10 exhibits a higher molecular weight (HMW) component of the polymer that is much larger than that of Example 9. Table II summarizes the Mw, the amount of the lower molecular weight (LMW) component, and the amount of the higher molecular weight (HMW) component for the polymers of Examples 9-10. The relative amounts of the LMW and HMW components in the polymer were determined using a commercial software program (Systat Software, Inc., Peak Fit™ v. 4.05) and a Gaussian distribution; see also U.S. Pat. No. 7,300,983, which is incorporated herein by reference in its entirety.

As shown in Table II, and unexpectedly, the sequential preparation of Example 10 resulted in a significant increase in the Mw and the amount of the HMW component of the polymer produced. The percentage increase in Mw from Example 9 to Example 10 was over 60%, and the ratio of the HMW component to the LMW component increased almost 100%.

TABLE II

Molecular weight properties of Examples 9-10.

| Example | Catalyst Preparation | Mw (kg/mol) | LMW (wt. %) | HMW (wt. %) |
|---|---|---|---|---|
| 9 | Standard | 279 | 80.1 | 19.9 |
| 10 | Sequential | 455 | 67.2 | 32.8 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A process to produce a catalyst composition, the process comprising:

(i) contacting an activator-support and an organoaluminum compound for a first period of time to form a precontacted mixture; and (ii) contacting the precontacted mixture with a metallocene compound for a second period of time to form the catalyst composition.

Embodiment 2

The process defined in embodiment 1, wherein the first period of time is in any range of first time periods disclosed herein, e.g., from about 10 sec to about 48 hr, from about 30 sec to about 6 hr, at least about 5 sec, at least about 1 min, etc.

Embodiment 3

The process defined in embodiment 1 or 2, wherein the second period of time is in any range of second time periods disclosed herein, e.g., from about 1 sec to about 48 hr, from about 1 min to about 6 hr, at least about 5 min, at least about 10 min, etc.

Embodiment 4

The process defined in any one of embodiments 1-3, wherein step (ii) comprises contacting the precontacted mixture with the metallocene compound and an additional organoaluminum compound.

Embodiment 5

A catalyst composition produced by the process defined in any one of embodiments 1-4.

Embodiment 6

A catalyst composition comprising:
(i) a precontacted mixture comprising:
an activator-support, and
an organoaluminum compound; and
(ii) a metallocene compound.

Embodiment 7

The process or composition defined in any one of embodiments 1-6, wherein an activity of the catalyst composition is greater (by any amount disclosed herein, e.g., at least about 10%, at least about 25%, at least about 100%, etc.) than that of a catalyst system obtained by first combining the activator-support and the metallocene compound, and then combining the organoaluminum compound, under the same polymerization conditions.

Embodiment 8

The process or composition defined in any one of embodiments 1-7, wherein an activity of the catalyst composition is from about 15% to about 1000% greater, or from about 75% to about 800% greater, etc., than that of a catalyst system obtained by first combining the activator-support and the metallocene compound, and then combining the organoaluminum compound, under the same polymerization conditions.

Embodiment 9

A process to produce a dual metallocene catalyst composition, the process comprising:
(a) contacting a first metallocene compound and an organoaluminum compound with a slurry of an activator-support for a first period of time to form a first mixture; and
(b) contacting the first mixture with a second metallocene compound for a second period of time to form the dual metallocene catalyst composition.

Embodiment 10

The process defined in embodiment 9, wherein the first period of time is in any range of first time periods disclosed herein, e.g., from about 10 sec to about 48 hr, from about 30 sec to about 6 hr, at least about 5 sec, at least about 1 min, etc.

Embodiment 11

The process defined in embodiment 9 or 10, wherein the first period of time is a time sufficient for the first metallocene compound to quantitatively react with the activator-support.

Embodiment 12

The process defined in any one of embodiments 9-11, wherein the second period of time is in any range of second time periods disclosed herein, e.g., from about 1 sec to about 48 hr, from about 30 sec to about 6 hr, from about 1 min to about 6 hr, at least about 5 sec, at least about 1 min, at least about 5 min, at least about 10 min, etc.

Embodiment 13

The process defined in any one of embodiments 9-12, wherein the second period of time is a time sufficient for the second metallocene compound to react with the activator-support, but not displace the first metallocene compound from the activator-support.

Embodiment 14

The process defined in any one of embodiments 9-13, wherein step (b) comprises contacting the first mixture with the second metallocene compound and an additional organoaluminum compound.

Embodiment 15

A catalyst composition produced by the process defined in any one of embodiments 9-14.

Embodiment 16

A dual metallocene catalyst composition comprising:
(a) a first mixture comprising:
a first metallocene compound,
an activator-support, and
an organoaluminum compound; and
(b) a second metallocene compound.

Embodiment 17

A process to produce a dual metallocene catalyst composition, the process comprising:
(A) contacting an activator-support and an organoaluminum compound for a first period of time to form a precontacted mixture;
(B) contacting the precontacted mixture with a first metallocene compound for a second period of time to form a first mixture; and
(C) contacting the first mixture with a second metallocene compound for a third period of time to form the dual metallocene catalyst composition.

Embodiment 18

The process defined in embodiment 17, wherein the first period of time is in any range of first time periods disclosed herein, e.g., from about 10 sec to about 48 hr, from about 30 sec to about 6 hr, at least about 5 sec, at least about 1 min, etc.

Embodiment 19

The process defined in embodiment 17 or 18, wherein the second period of time is in any range of second time periods disclosed herein, e.g., from about 10 sec to about 48 hr, from about 30 sec to about 6 hr, at least about 5 sec, at least about 1 min, etc.

Embodiment 20

The process defined in any one of embodiments 17-19, wherein the second period of time is a time sufficient for the first metallocene compound to quantitatively react with the activator-support.

Embodiment 21

The process defined in any one of embodiments 17-20, wherein the third period of time is in any range of third time periods disclosed herein, e.g., from about 1 sec to about 48 hr, from about 30 sec to about 6 hr, from about 1 min to about 6 hr, at least about 5 sec, at least about 1 min, at least about 5 min, at least about 10 min, etc.

Embodiment 22

The process defined in any one of embodiments 17-21, wherein the third period of time is a time sufficient for the second metallocene compound to react with the activator-support, but not displace the first metallocene compound from the activator-support.

Embodiment 23

The process defined in any one of embodiments 17-22, wherein step (B) comprises contacting the precontacted mixture with the first metallocene compound and a first additional organoaluminum compound.

Embodiment 24

The process defined in any one of embodiments 17-23, wherein step (C) comprises contacting the first mixture with the second metallocene compound and a second additional organoaluminum compound.

Embodiment 25

A catalyst composition produced by the process defined in any one of embodiments 17-24.

Embodiment 26

A dual metallocene catalyst composition comprising:
a first mixture comprising:
a first metallocene compound, and
a precontacted mixture comprising:
an activator-support, and
an organoaluminum compound; and
a second metallocene compound.

Embodiment 27

The process or composition defined in any one of embodiments 9-26, wherein the first metallocene compound is less reactive with the activator-support than the second metallocene compound.

Embodiment 28

The process or composition defined in any one of embodiments 9-27, wherein a weight ratio of the first metallocene compound to the second metallocene compound is in any range of weight ratios disclosed herein, e.g., from about 1:100 to about 100:1, from about 1:5 to about 5:1, from about 1:2 to about 2:1, etc.

Embodiment 29

The process or composition defined in any one of embodiments 9-28, wherein an activity of the catalyst composition is greater (by any amount disclosed herein, e.g., at least about 10%, at least about 25%, at least about 100%, etc.) than that of a dual catalyst system obtained by combining the activator-support, a mixture of the first metallocene compound and the second metallocene compound, and the organoaluminum compound, under the same polymerization conditions.

Embodiment 30

The process or composition defined in any one of embodiments 9-29, wherein a Mw of an olefin polymer produced using the catalyst composition is greater (by any amount disclosed herein, e.g., at least about 5%, at least about 10%, at least about 15%, etc.) than that of an olefin polymer produced using a dual catalyst system obtained by combining the activator-support, a mixture of the first metallocene compound and the second metallocene compound, and the organoaluminum compound, under the same polymerization conditions.

Embodiment 31

The process or composition defined in any one of embodiments 1-30, wherein the activator-support comprises a solid oxide treated with an electron-withdrawing anion, for example, comprising any solid oxide treated with any electron-withdrawing anion disclosed herein.

Embodiment 32

The process or composition defined in any one of embodiments 1-31, wherein the activator-support comprises a fluorided solid oxide, a sulfated solid oxide, a phosphated solid oxide, or a combination thereof.

Embodiment 33

The process or composition defined in any one of embodiments 1-31, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Embodiment 34

The process or composition defined in any one of embodiments 1-31, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 35

The process or composition defined in any one of embodiments 1-31, wherein the activator-support comprises fluorided alumina, fluorided silica-alumina, fluorided silica-zirconia, fluorided silica-coated alumina, or any combination thereof (e.g., fluorided silica-alumina or fluorided silica-coated alumina).

Embodiment 36

The process or composition defined in any one of embodiments 1-31, wherein the activator-support comprises sulfated

Embodiment 37

The process or composition defined in any one of embodiments 1-36, wherein the activator-support further comprises any metal or metal ion disclosed herein, e.g., zinc, nickel, vanadium, titanium, silver, copper, gallium, tin, tungsten, molybdenum, zirconium, or any combination thereof.

Embodiment 38

The process or composition defined in any one of embodiments 1-37, wherein the organoaluminum compound and any additional organoaluminum compound(s) are the same or different and comprise any organoaluminum compound disclosed herein.

Embodiment 39

The process or composition defined in any one of embodiments 1-38, wherein the organoaluminum compound and any additional organoaluminum compound(s) are the same or different and comprise trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 40

The process or composition defined in embodiment 38 or 39, wherein at least one organoaluminum compound comprises triethylaluminum.

Embodiment 41

The process or composition defined in embodiment 38 or 39, wherein at least one organoaluminum compound comprises triisobutylaluminum.

Embodiment 42

The process or composition defined in any one of embodiments 1-41, wherein the catalyst composition is substantially free of aluminoxane compounds, organoboron or organoborate compounds, ionizing ionic compounds, or combinations thereof.

Embodiment 43

The process or composition defined in any one of embodiments 9-42, wherein the first metallocene compound produces a higher molecular weight component of an olefin polymer than the second metallocene compound.

Embodiment 44

The process or composition defined in any one of embodiments 1-43, wherein the metallocene compound (or first metallocene compound) comprises a bridged metallocene compound, e.g., any bridged metallocene compound disclosed herein.

Embodiment 45

The process or composition defined in any one of embodiments 1-44, wherein the metallocene compound (or first metallocene compound) comprises a bridged zirconium based metallocene compound with a fluorenyl group, and with no aryl groups on the bridging group.

Embodiment 46

The process or composition defined in any one of embodiments 1-44, wherein the metallocene compound (or first metallocene compound) comprises a bridged zirconium based metallocene compound with a cyclopentadienyl group and a fluorenyl group, and with no aryl groups on the bridging group.

Embodiment 47

The process or composition defined in any one of embodiments 1-44, wherein the metallocene compound (or first metallocene compound) comprises a bridged zirconium or hafnium based metallocene compound with a fluorenyl group, and an aryl group on the bridging group.

Embodiment 48

The process or composition defined in any one of embodiments 1-44, wherein the metallocene compound (or first metallocene compound) comprises a bridged zirconium or hafnium based metallocene compound with a cyclopentadienyl group and fluorenyl group, and an aryl group on the bridging group.

Embodiment 49

The process or composition defined in any one of embodiments 1-44, wherein the metallocene compound (or first metallocene compound) comprises a bridged zirconium based metallocene compound with a fluorenyl group, and an aryl group on the bridging group.

Embodiment 50

The process or composition defined in any one of embodiments 1-44, wherein the metallocene compound (or first metallocene compound) comprises a bridged hafnium based metallocene compound with a fluorenyl group, and an aryl group on the bridging group.

Embodiment 51

The process or composition defined in any one of embodiments 47-50, wherein the aryl group is a phenyl group.

Embodiment 52

The process or composition defined in any one of embodiments 1-44, wherein the metallocene compound (or first metallocene compound) comprises a bridged zirconium or hafnium based metallocene compound with two indenyl groups.

Embodiment 53

The process or composition defined in any one of embodiments 1-44, wherein the metallocene compound (or first metallocene compound) comprises a bridged zirconium based metallocene compound with two indenyl groups.

Embodiment 54

The process or composition defined in any one of embodiments 52-53, wherein the bridging group contains a silicon atom.

Embodiment 55

The process or composition defined in any one of embodiments 1-54, wherein the metallocene compound (or second metallocene compound) comprises an unbridged metallocene compound, e.g., any unbridged metallocene compound disclosed herein.

Embodiment 56

The process or composition defined in any one of embodiments 1-55, wherein the metallocene compound (or second metallocene compound) comprises an unbridged zirconium or hafnium based metallocene compound containing two cyclopentadienyl groups, two indenyl groups, or a cyclopentadienyl and an indenyl group.

Embodiment 57

The process or composition defined in any one of embodiments 1-55, wherein the metallocene compound (or second metallocene compound) comprises an unbridged zirconium based metallocene compound containing two cyclopentadienyl groups, two indenyl groups, or a cyclopentadienyl and an indenyl group.

Embodiment 58

The process or composition defined in any one of embodiments 1-55, wherein the metallocene compound (or second metallocene compound) comprises an unbridged zirconium based homodinuclear metallocene compound.

Embodiment 59

The process or composition defined in any one of embodiments 1-55, wherein the metallocene compound (or second metallocene compound) comprises an unbridged hafnium based homodinuclear metallocene compound.

Embodiment 60

The process or composition defined in any one of embodiments 1-55, wherein the metallocene compound (or second metallocene compound) comprises an unbridged heterodinuclear metallocene compound.

Embodiment 61

The process or composition defined in any one of embodiments 1-60, wherein the weight ratio of the metallocene compound (or first and second metallocene compounds) to the activator-support is in any range of weight ratios disclosed herein, e.g., from about 1:1 to about 1:1,000,000, from about 1:10 to about 1:10,000, from about 1:20 to about 1:1000, etc.

Embodiment 62

The process or composition defined in any one of embodiments 1-61, wherein the weight ratio of the activator-support to the organoaluminum compound (or compounds) is in any range of weight ratios disclosed herein, e.g., from about 1:5 to about 1000:1, from about 1:3 to about 200:1, from about 1:1 to about 100:1, etc.

Embodiment 63

An olefin polymerization process, the process comprising contacting the catalyst composition defined in any one of embodiments 1-62 with an olefin monomer and an optional olefin comonomer in a polymerization reactor system under polymerization conditions to produce an olefin polymer.

Embodiment 64

An olefin polymerization process, the process comprising contacting the catalyst composition defined in any one of embodiments 9-62 with an olefin monomer and an optional olefin comonomer in a polymerization reactor system under polymerization conditions to produce an olefin polymer, wherein a Mw of the olefin polymer produced by the process is greater (by any amount disclosed herein, e.g., at least about 5%, at least about 10%, at least about 15%, etc.) than the Mw of an olefin polymer produced under the same polymerization conditions using a dual catalyst system obtained by simultaneously combining the activator-support, the first metallocene compound, the second metallocene compound, and the organoaluminum compound.

Embodiment 65

An olefin polymerization process, the process comprising contacting the catalyst composition defined in any one of embodiments 9-62 with an olefin monomer and an optional olefin comonomer in a polymerization reactor system under polymerization conditions to produce an olefin polymer, wherein the olefin polymer comprises a higher molecular weight component and a lower molecular weight component, wherein a ratio of the higher molecular weight component to the lower molecular weight component of the olefin polymer produced by the process is greater (by any amount disclosed herein, e.g., at least about 5%, at least about 10%, at least about 15%, etc.) than the ratio for an olefin polymer produced under the same polymerization conditions using a dual catalyst system obtained by simultaneously combining the activator-support, the first metallocene compound, the second metallocene compound, and the organoaluminum compound.

Embodiment 66

The process defined in any one of embodiments 63-65, wherein the olefin monomer comprises any olefin monomer disclosed herein, e.g., any $C_2$-$C_{20}$ olefin.

Embodiment 67

The process defined in any one of embodiments 63-66, wherein the olefin monomer and the optional olefin comonomer independently comprise a $C_2$-$C_{20}$ alpha-olefin.

Embodiment 68

The process defined in any one of embodiments 63-67, wherein the olefin monomer comprises ethylene.

Embodiment 69

The process defined in any one of embodiments 63-68, wherein the catalyst composition is contacted with ethylene and an olefin comonomer comprising a $C_3$-$C_{10}$ alpha-olefin.

Embodiment 70

The process defined in any one of embodiments 63-69, wherein the catalyst composition is contacted with ethylene and an olefin comonomer comprising 1-butene, 1-hexene, 1-octene, or a mixture thereof.

Embodiment 71

The process defined in any one of embodiments 63-67, wherein the olefin monomer comprises propylene.

Embodiment 72

The process defined in any one of embodiments 63-71, wherein the polymerization reactor system comprises a batch reactor, a slurry reactor, a gas-phase reactor, a solution reactor, a high pressure reactor, a tubular reactor, an autoclave reactor, or a combination thereof.

Embodiment 73

The process defined in any one of embodiments 63-72, wherein the polymerization reactor system comprises a slurry reactor, a gas-phase reactor, a solution reactor, or a combination thereof.

Embodiment 74

The process defined in any one of embodiments 63-73, wherein the polymerization reactor system comprises a loop slurry reactor.

Embodiment 75

The process defined in any one of embodiments 63-74, wherein the polymerization reactor system comprises a single reactor.

Embodiment 76

The process defined in any one of embodiments 63-74, wherein the polymerization reactor system comprises 2 reactors.

Embodiment 77

The process defined in any one of embodiments 63-74, wherein the polymerization reactor system comprises more than 2 reactors.

Embodiment 78

The process defined in any one of embodiments 63-77, wherein the olefin polymer comprises any olefin polymer disclosed herein.

Embodiment 79

The process defined in any one of embodiments 63-78, wherein the olefin polymer is an ethylene homopolymer, an ethylene/1-butene copolymer, an ethylene/1-hexene copolymer, or an ethylene/1-octene copolymer.

Embodiment 80

The process defined in any one of embodiments 63-79, wherein the olefin polymer is an ethylene/1-hexene copolymer.

Embodiment 81

The process defined in any one of embodiments 63-78, wherein the olefin polymer is a polypropylene homopolymer or a propylene-based copolymer.

Embodiment 82

An olefin polymer produced by the olefin polymerization process defined in any one of embodiments 63-81.

Embodiment 83

An article comprising the olefin polymer defined in embodiment 82.

Embodiment 84

A method or forming or preparing an article of manufacture comprising an olefin polymer, the method comprising (i) performing the olefin polymerization process defined in any one of embodiments 63-81 to produce the olefin polymer, and (ii) forming the article of manufacture comprising the olefin polymer, e.g., via any technique disclosed herein.

Embodiment 85

The article defined in embodiment 83 or 84, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A process to produce a catalyst composition, the process comprising:
   (i) contacting an activator-support and an organoaluminum compound for a first period of time to form a precontacted mixture; and
   (ii) contacting the precontacted mixture with a metallocene compound for a second period of time to form the catalyst composition; wherein:
   an activity of the catalyst composition is from about 15% to about 1000% greater than that of a catalyst system obtained by first combining the activator-support and the metallocene compound, and then combining the organoaluminum compound, under the same polymerization conditions.

2. The process of claim 1, wherein:
   the activator-support comprises a fluorided solid oxide, a sulfated solid oxide, a phosphated solid oxide, or a combination thereof; and
   the metallocene compound comprises a bridged zirconium or hafnium based metallocene compound with a cyclopentadienyl group and a fluorenyl group.

3. The process of claim 1, wherein:
the first period of time is at least about 5 minutes; and
the activity of the catalyst composition is from about 25% to about 750% greater than that of a catalyst system obtained by first combining the activator-support and the metallocene compound, and then combining the organoaluminum compound, under the same polymerization conditions.

4. The process of claim 1, wherein:
the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof; and
the activator-support comprises fluorided silica-alumina, fluorided silica-coated alumina, sulfated alumina, or a combination thereof.

5. The process of claim 1, wherein:
the weight ratio of the metallocene compound to the activator-support is in a range from about 1:10 to about 1:10,000; and
the weight ratio of the activator-support to the organoaluminum compound is in a range from about 1:5 to about 1000:1.

6. An olefin polymerization process, the olefin polymerization process comprising:
(i) contacting an activator-support and an organoaluminum compound for a first period of time to form a precontacted mixture;
(ii) contacting the precontacted mixture with a metallocene compound for a second period of time to form the catalyst composition; and
(iii) contacting the catalyst composition with an olefin monomer and an optional olefin comonomer in a polymerization reactor system under polymerization conditions to produce an olefin polymer; wherein:
an activity of the catalyst composition is from about 15% to about 1000% greater than that of a catalyst system obtained by first combining the activator-support and the metallocene compound, and then combining the organoaluminum compound, under the same polymerization conditions.

7. The olefin polymerization process of claim 6, wherein:
the activator-support comprises fluorided silica-alumina, fluorided silica-coated alumina, sulfated alumina, phosphated alumina, or a combination thereof;
the polymerization reactor system comprises a slurry reactor, a gas-phase reactor, a solution reactor, or a combination thereof; and
the olefin monomer comprises ethylene and the olefin comonomer comprises a $C_3$-$C_{10}$ alpha-olefin.

8. The process of claim 1, wherein the weight ratio of the metallocene compound to the activator-support is in a range from about 1:20 to about 1:1000.

9. The process of claim 8, wherein the metallocene compound comprises a bridged zirconium or hafnium based metallocene compound with a cyclopentadienyl group and a fluorenyl group.

10. The process of claim 9, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

11. The process of claim 1, wherein the activator-support comprises a fluorided solid oxide.

12. The process of claim 1, wherein the activator-support comprises a sulfated solid oxide.

13. The process of claim 1, wherein the activator-support comprises fluorided silica-alumina, fluorided silica-coated alumina, sulfated alumina, or a combination thereof.

14. The process of claim 1, wherein the metallocene compound comprises an unbridged zirconium or hafnium based metallocene compound containing two cyclopentadienyl groups, two indenyl groups, or a cyclopentadienyl and an indenyl group.

15. The process of claim 1, wherein the first period of time is from about 30 seconds to about 6 hours.

16. The process of claim 1, wherein:
the activator-support comprises a fluorided solid oxide, a sulfated solid oxide, a phosphated alumina, or a combination thereof; and
the organoaluminum compound comprises trimethylaluminum, triethylaluminum, tri-n-propylaluminum, tri-n-butylaluminum, triisobutylaluminum, or any combination thereof.

17. The process of claim 16, wherein the activity of the catalyst composition is from about 25% to about 750% greater than that of a catalyst system obtained by first combining the activator-support and the metallocene compound, and then combining the organoaluminum compound, under the same polymerization conditions.

18. The olefin polymerization process of claim 6, wherein the polymerization reactor system comprises a loop slurry reactor.

19. The olefin polymerization process of claim 6, wherein:
the activator-support comprises a fluorided solid oxide, a sulfated solid oxide, a phosphated solid oxide, or a combination thereof; and
the olefin polymer is an ethylene homopolymer, an ethylene/1-butene copolymer, an ethylene/1-hexene copolymer, or an ethylene/1-octene copolymer.

20. The olefin polymerization process of claim 6, wherein:
the metallocene compound comprises a bridged zirconium or hafnium based metallocene compound with a cyclopentadienyl group and a fluorenyl group; and
the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

21. The olefin polymerization process of claim 20, wherein the catalyst composition is contacted with ethylene and an olefin comonomer comprising 1-butene, 1-hexene, 1-octene, or a mixture thereof.

22. The olefin polymerization process of claim 21, wherein the activity of the catalyst composition is from about 25% to about 750% greater than that of a catalyst system obtained by first combining the activator-support and the metallocene compound, and then combining the organoaluminum compound, under the same polymerization conditions.

* * * * *